UNITED STATES PATENT OFFICE.

OGDEN BOLTON, OF CANTON, OHIO.

IMPROVEMENT IN MANUFACTURE OF STEEL.

Specification forming part of Letters Patent No. 214,088, dated April 8, 1879; Reissue No. 8,945, dated October 28, 1879; application filed October 2, 1879.

*To all whom it may concern:*

Be it known that I, OGDEN BOLTON, of Canton, in the county of Stark and State of Ohio, have invented a new and useful Improvement in Manufacture of Steel; and I do hereby declare the following to be a full, clear, and exact description thereof.

My invention relates to a new method of manufacturing steel in what is commonly known as the "open hearth"—that is to say, in a Siemens or equivalent furnace—and has for its principal object the production of high grades of steel, suitable for tools, &c., for which the more expensive crucible-steel is now necessarily used.

In the ordinary process of making steel by the open-hearth process a bath of molten cast-iron is first prepared, and the process consists of decarburizing the molten metal by introducing into this bath wrought-iron or other iron low in carbon or ore, for the purpose of decarburizing the melted metal, which is effected by the melting a sufficient quantity of the wrought-iron in the pig-iron to reduce the percentage of carbon in the whole mass sufficiently to form steel, the melted product being finally recarburized by the addition of ferro-manganese or spiegeleisen.

It has also been proposed, though I believe without success, to reduce iron ore by deoxidation and to melt it by the aid of carbon in the hearth of the melting-furnace to form a bath of highly-carburized molten metal, in which bath a further charge of reduced ore or blooms may be introduced, which are melted in the bath thus prepared for the purpose of decarburizing the bath.

My process, however, differs from both of these in that it is a carburizing and not a decarburizing process, and consists in melting puddle or charcoal blooms, or iron having a low percentage of carbon, or scrap-steel, on the surface of a charge of carbon in an open-hearth furnace, so that the melting metal may trickle down through the carbon, and thereby become carburized to the required degree to form steel. The melted product is recarburized with spiegeleisen, if necessary. By my process I am enabled to produce a high grade of steel equal to English tool-steel, which, I believe, cannot be accomplished by the previously-known processes which I have referred to.

I will now describe my invention, so that others skilled in the art to which it appertains may apply the same.

I first take carbon in any convenient form and charge the same into an open-hearth furnace—either a Siemens or equivalent furnace—after which I place puddled or charcoal blooms or soft steel thereon and melt the same, so that the molten metal shall run down through the carbon and combine therewith. When the iron is all melted I sample it, and if higher in carbon than required, add such percentage of blooms or equivalent as will reduce the carbon to, or very near to, the desired per cent. I then tap the molten steel thus produced into a ladle or equivalent vessel, and add thereto spiegeleisen or ferro-manganese.

In practice I have found the following quantities of carbon, iron, &c., to produce good tool-steel, and therefore recite the same, but do not expect or intend to be limited thereto.

I take three hundred and fifty (350) pounds of carbon and pack it in wooden boxes, preferably about four feet long, one foot wide, and one foot deep. These boxes so filled I charge into the furnace, placing them at the lowest or deepest part of the furnace, and on top thereof I charge eleven thousand (11,000) pounds of iron blooms. When the iron is all melted I take out a sample and usually find the percentage of carbon to be about 1.50 per cent., and if the percentage of carbon is higher than I desire, I add more iron blooms to the bath until a proper test shows the percentage of carbon in the bath to be about .05 per cent. higher than I require in the finished steel. I then tap the steel into the ladle, and as the steel is running out of the furnace I add about one per cent. of ferro-manganese, allowing the lumps (if not previously melted) to drop into the running stream of steel, thus getting a thorough mixture.

It is not absolutely necessary to add the per cent. of ferro-manganese specified, as I find that I can run the steel made by the described process with but a trace of ferro-manganese, or practically none at all, and the less ferro-manganese is used the finer will be the steel.

In lieu of packing the carbon in boxes or canisters, it may be compressed or otherwise formed into a solid mass, or in some cases, though not by preference, it may be charged loosely or in powdered form.

Steel made as specified will be found equal to good English tool-steel, and has been used successfully in the manufacture of nailers' knives, lathe-tools, blacksmiths' tools, oil-well tools, and taps and dies.

For the commoner grades of steel cheap blooms can be used; and in making lower carbon-steel so much carbon will not be required to commence with, as 1.5 per cent. of carbon at the start will give about one per cent. in the steel.

I am aware that in the manufacture of steel by the crucible process blooms have been reduced to shavings or small pieces and put in the melting-pot together with carbonaceous material and a flux of lime, the whole being melted and poured as in manufacturing steel from bar-iron; but this has reference to a different process of steel-making, which I do not claim.

Having thus described my invention, what I claim, and desire to secure by Letters Patent, is—

1. The method herein described for the manufacture of steel by the open-hearth process, the same consisting in first charging the carbon on the bottom of the open hearth, and charging the blooms or soft steel or any part of them on top of the carbonaceous matter previous to fusion, substantially as and for the purpose specified, so that the iron may melt on the surface of the carbon and become carburized as it trickles through it.

2. In the manufacture of steel by the open-hearth process, first charging the carbon solidified or packed in boxes or canisters on the bottom of the open hearth, and then charging the blooms or soft steel thereon, substantially as and for the purpose specified.

3. In the manufacture of steel by the open-hearth process, first charging the carbon on the bottom of the furnace or open hearth; secondly, charging the blooms or soft steel, then melting the mass; and, finally, adding ferro-manganese or spiegeleisen after or at the time the molten metal is tapped from the furnace, substantially as and for the purpose specified.

In witness whereof I, the said OGDEN BOLTON, have hereunto set my hand.

OGDEN BOLTON.

Witnesses:

C. E. MILLIKEN,

T. B. KERR.